April 8, 1952      J. H. HURLBUT ET AL      2,592,424
THERMOSTATIC CONTROL DEVICE
Original Filed Jan. 14, 1946      3 Sheets-Sheet 1

JAMES H. HURLBUT,
CHARLES R. HEININGER,
INVENTORS.

BY
*Albert J. Henderson*
ATTORNEY.

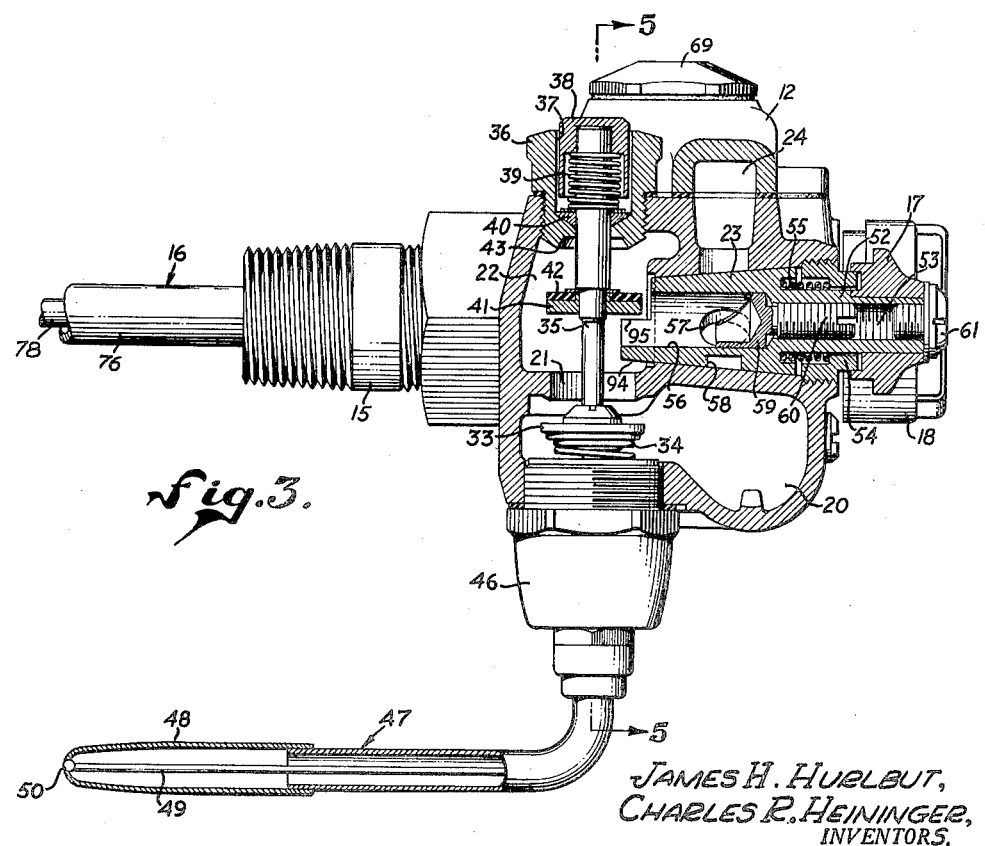

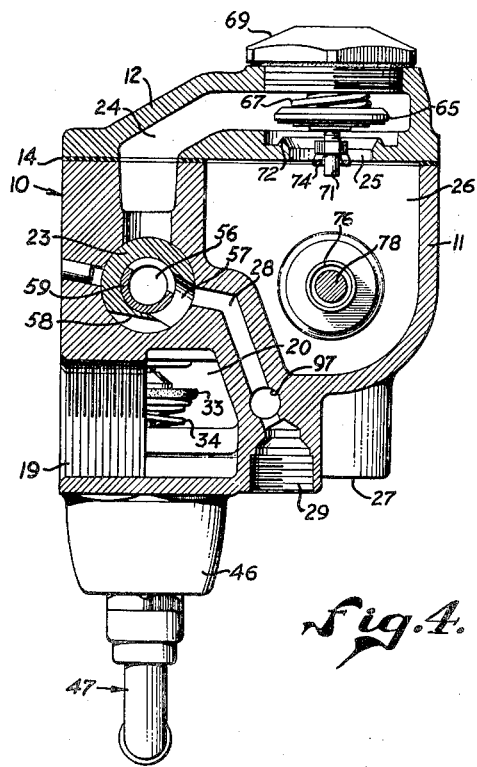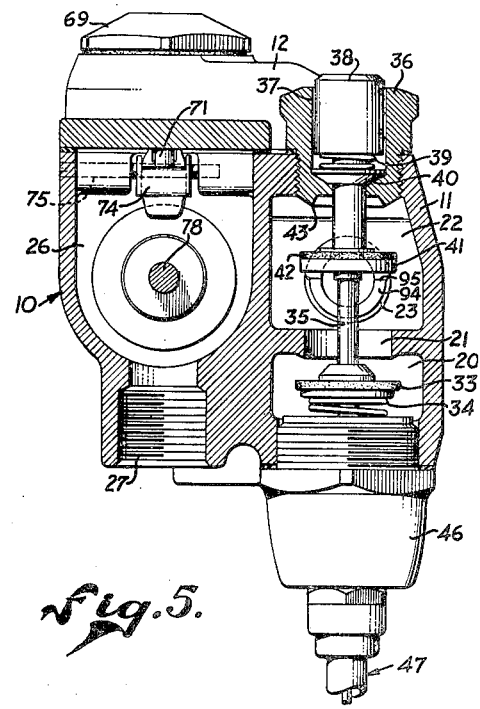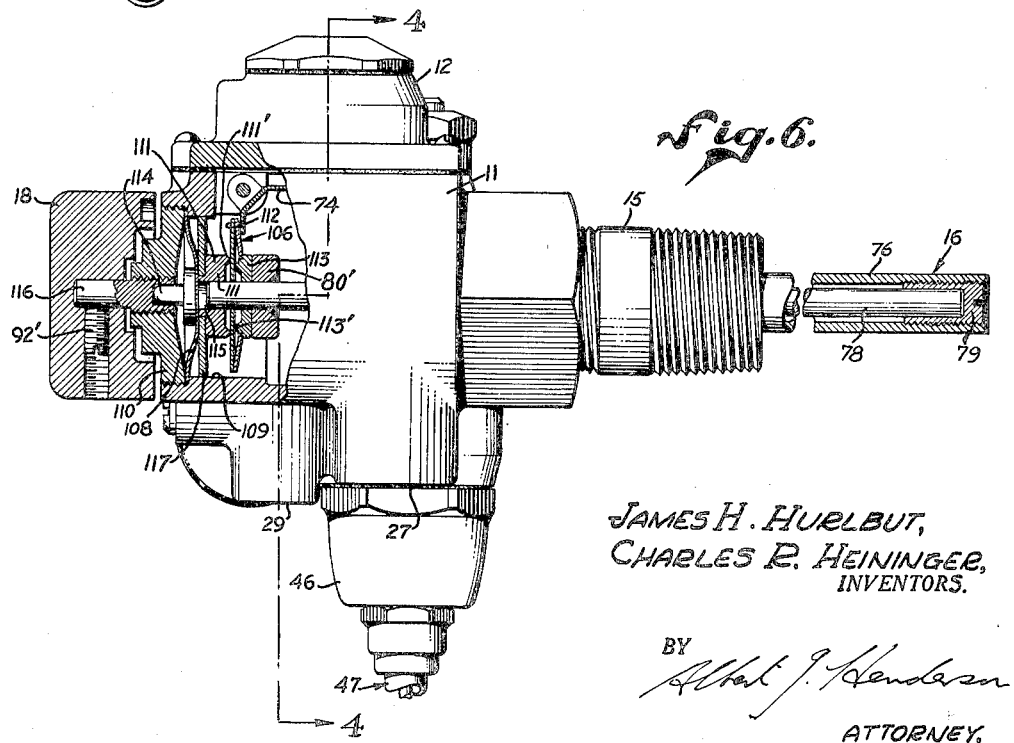

Patented Apr. 8, 1952

2,592,424

UNITED STATES PATENT OFFICE 2,592,424

THERMOSTATIC CONTROL DEVICE

James H. Hurlbut, South Gate, and Charles R. Heininger, Stockton, Calif., assignors to Robertshaw-Fulton Controls Company, Greensburg, Pa., a corporation of Delaware Original application January 14, 1946, Serial No. 641,037. Divided and this application January 26, 1950, Serial No. 140,728

3 Claims. (Cl. 236—48)

This invention relates to controls for fluid fuel burners and more particularly to thermostatic control devices for regulating the flow of fuel to the burners by means of a valve movable between controlling positions with a snap-action. This application is a division of our copending application, Serial No. 641,037, filed January 14, 1946, now Patent No. 2,584,458, dated February 5, 1952.

It is a principal object of this invention to effect adjustment of the temperature to which the valve will respond by means operable exteriorly of the device while precluding the possibility of fuel leakage therefrom.

Another object of this invention is to effect adjustment of a snap-action mechanism disposed within a valve casing by means operable exteriorly of the casing and separated from the snap-action mechanism by an imperforate seal to thereby set the temperature at which the valve will be actuated.

A preferred form of this invention has a snap-action mechanism with a movable fulcrum member disposed within a valve casing which is provided with a port closed by a flexible diaphragm. The fulcrum member is operatively engageable with one side of the diaphragm and adjusting means is operatively engageable with the other side of the diaphragm to set the position of the fulcrum member and thereby set the temperature at which the valve will be actuated.

In the drawings:

Figure 3 is a longitudinal, sectional view taken on the line 3—3 of Figure 2.

Figure 4 is a cross-sectional view taken on the line 4—4 of Figure 6.

Figure 5 is a cross-sectional view taken on the line 5—5 of Figure 3.

Figure 6 is a side view of the device with a portion of the casing broken away showing the interior construction.

Figure 1:
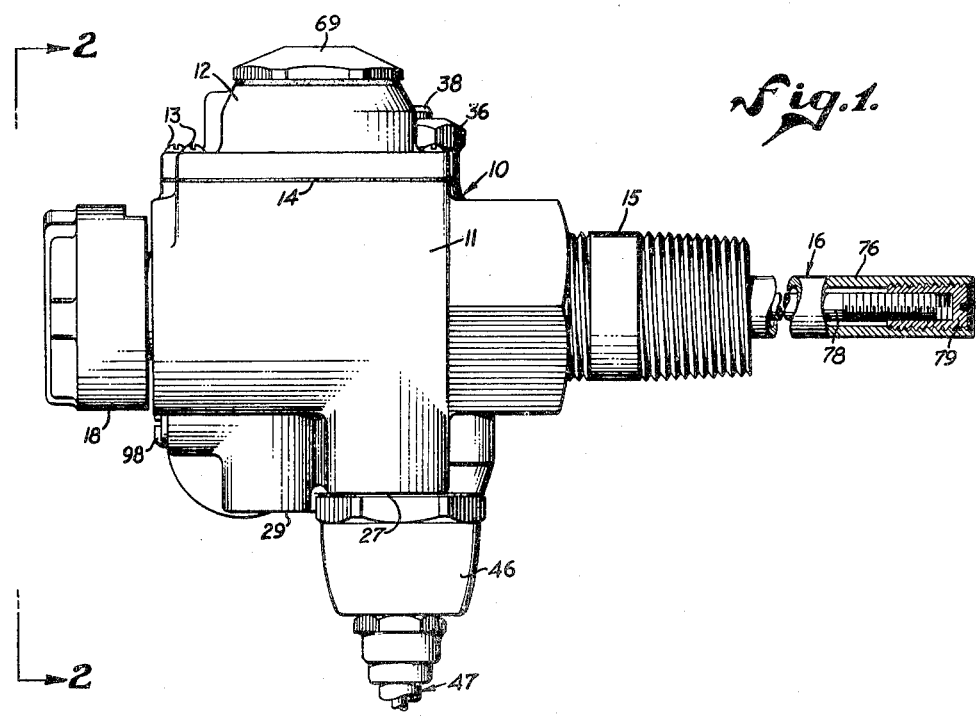
Figure 1 is a side elevational view of the device including a fragment of a thermostat element in section.

Referring to the drawings, the invention is shown as being embodied in a combination thermostat and automatic pilot control device. The device is incorporated in a single casing identified generally by the character 10 which consists of a body 11 defining the several chambers, the top of which is closed by a cap or bonnet 12 attached by screws 13 which draw the cap against a suitable gasket 14 in order to seal the connection between the cap and the body. At the rear of the casing is a threaded fitting 15 by means of which the casing may be attached to an appropriate gas heated appliance, the fitting providing a means by which a temperature sensing unit 16 may be extended from the casing into the appliance.

On the front of the casing is provided a handle 17 for controlling the flow of gas into the casing. The handle may, as indicated, be set at either "off" position, "pilot" position, or "on" position, the latter position permitting gas to flow both to a pilot light and a main burner located within the appliance. Also, on the front of the casing is provided an adjusting knob or wheel 18 bearing suitable indicia and adapted to be rotated for adjusting the thermostat assembly member in order to maintain either a hot condition, a normal condition, or a relatively cold condition in the gas heated appliance.

When the device is in operating condition, gas will flow into the casing, through various chambers and valve ports within the casing wherein it is subject to safety and thermostatic control, and thence outwardly from the casing either to a gas line supplying the main burner or to a gas line supplying the pilot burner or to both. In order to simplify this description, the gas lines and burners have been omitted but may be considered as being located within any appliance to which the device may be attached.

The casing is provided with an inlet port 19 located at the left side of the body, as shown in Figure 4, through which gas passes from a supply line to a primary chamber 20. Gas follows a path through the various interior portions of the casing defined successively by the primary chamber 20, an internal valved port 21, a secondary dispersion chamber 22 (see Figure 3), thence through the interior of a plug valve member 23, from which it travels through a valved passage 24 past a control port 25 into a distributing chamber 26. At the bottom of the distributing chamber is an outlet port 27 (Figure 6) which is adapted to be connected to a gas line supplying the main burner of any appliance with which the unit control may be used. Also, connected to the plug valve member is a pilot passage 28 (Figure 4) which is connected to a pilot outlet 29 in turn adapted to be attached to a gas line supplying a pilot light installed in the same appliance.

In initial position gas is prevented from flowing through the control device by reason of the fact that a safety valve element 33 is pushed to a closed position by a coiled spring 34 located beneath the valve and tending to press the valve upwardly to seat against the lower side of the internal valved port. In order to open the safety valve, there is provided a stem 35 having a limited sliding attachment to the safety valve element. The stem extends outwardly through a packing nut 36 to the exterior of the casing. The packing nut is provided with a pocket 37 within which is positioned a push button 38 attached to the outside end of the valve stem and normally lifted to a distended position by a coiled spring 39. A sealed friction packing 40 is provided at the inside end of the pocket so that gas will not leak past the stem.

To add to the seal where the stem passes through the casing there is provided a sealing disk 41 having a soft face 42 designed to be pressed against an annular rim 43 surrounding the aperture in the lower end of the packing nut. The sealing disk is normally seated upon the annular rim except for a brief moment while the pilot light is being lit.

A thermo-electric magnetic means is provided for holding the safety valve in open position. This device consists of a magnetic coil of somewhat conventional design housed within a fitting 46 which is located beneath the casing and extends threadedly into the primary chamber 20. Within the fitting is located the electro-magnetic coil, of standard construction, operable to attract and hold the safety valve element constructed of a suitable metal. For supplying electric current to the electro-magnetic coil there is provided a thermo-couple 47, likewise of previously known construction, and consisting of an outer tube 48 of one kind of metal housing therein and a rod 49 of another kind of metal joined at a point 50 which is adapted to be located near the pilot flame. The thermo-couple is of such construction that when heated an electric current is generated which energizes the electro-magnetic coil in turn attracting and holding the safety valve element.

To set the control device so that the safety valve is opened, the push button 38 is pressed downwardly which in turn through the stem 35 depresses the safety valve against spring pressure to the position shown in Figures 3, 4 and 5.

The control device is so arranged that setting of the safety valve element 33 is prevented except when the handle 17 and plug valve member are turned to pilot position. In other positions of the handle 17, namely, "off" and "on" positions, it is not possible to depress control button 38 to permit flow of gas through either the main burner or the pilot burner.

While the safety valve is being held down, the pilot flame is lit and permitted to burn until the thermo-couple is heated a sufficient amount. When heating has reached a certain point, sufficient electricity will be generated to energize the electro-magnetic coil which will hold the safety valve element against it, in open position. As soon as this has occurred, pressure on the push button may be released, and the coiled spring 39 will elevate the push button together with the stem which is permitted to slide upwardly relative to the safety valve element. The stem will move upwardly until the sealing disk finds its position against the annular rim 43. The safety valve will then remain open until something occurs to extinguish the pilot light and permit the thermo-couple to cool. Upon cooling, the supply of electric energy is cut off and the electro-magnetic coil becomes de-energized releasing the safety valve element which is then pressed upwardly to closed position.

Figure 2:
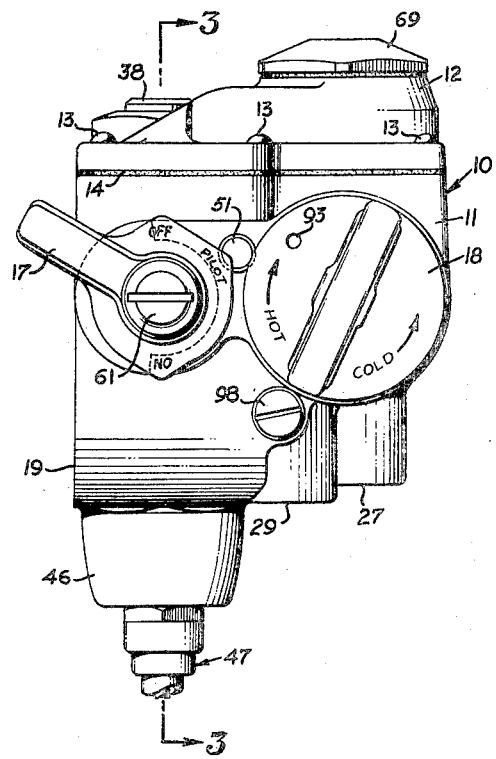
Figure 2 is a front elevational view.

For controlling the flow of gas which passes from the primary chamber through the open valved port 21 into the secondary dispersion chamber for distribution to the burners, there is provided a manual control incorporated in the plug valve 23 which is manipulated by the handle 17. As indicated in Figure 2, the handle has three positions, namely, an off position, a pilot position and an on position wherein gas is supplied to both the pilot and the main burner. The handle is shown in pilot position in Figure 2 wherein the point marked "Pilot" is turned to a position opposite a position marker 51. Pilot position of the plug valve member is also illustrated in Figure 4.

The plug valve member shown in Figure 3 is provided with a valve stem 52 having a hollow threaded interior 53 and extending outwardly through a packing gland 54 attached to the casing. Within the packing gland is a coiled spring 55 retained in a suitable recess and adapted to press the plug valve element inwardly into seating position. The handle 17 is non-rotatably attached to the outside end of the valve stem.

As indicated in Figures 3 and 4, the plug valve member is provided with an axial interior passage 56 having a lateral outlet port 57 which communicates between the interior passage and one or another, or both, of passages 24 and 28. On the exterior of the plug valve member is a slot 58 communicating with the outlet port in such a manner that when the lateral outlet port is directed toward the valved passage 24 gas may also pass through the slot to the pilot passage 28.

For controlling the rate of flow of gas to the main burner through the valved passage 24, in the event gas pressure might be changed for one reason or another, there is provided an adjusting plug 59 which has its position within the axial interior passage 56. The adjusting plug has a beveled end so that a gradual, carefully controlled adjustment may be made as the plug is moved to one of several positions partially closing the lateral outlet port. In order to change the adjustment, the plug is provided with a threaded stem 60 engaging the threads within the plug valve stem. A screw driver slot is provided in the stem 60, and access is gained by removal of a cap screw 61 at the outside end of the plug valve stem. After the adjustment is completed, the cap screw is replaced and screwed tight so that the hollow interior of the plug valve stem is sealed against possible escape of gas.

For controlling the flow of gas into the control chamber 26 and thence outwardly to the main burner there is provided a control valve member 65 which is adapted to cooperate with the temperature sensing unit 16 through a snap action mechanism 66. Details of a satisfactory type of snap action mechanism will be found illustrated and explained in Patent No. 2,238,837.

The control valve element is normally urged downwardly to a closed position by means of a coiled spring 67 retained by a suitable spring keeper (not shown) formed integral with a cap 69, the cap having a sealed position with respect to the casing and in particular to the bonnet 12. The valve element has a stem 70 slidably positioned within a suitable bore inside the spring keeper and is provided with a threaded extension 71 by means of which action of the valve may be adjusted. The valve is adapted to seat upon an annular valve seat 72 surrounding a control valve port 73.

For lifting the control valve from its seat to open position and subsequently permitting it to close, the temperature sensing unit operates through the snap action mechanism which in turn is connected to a bell crank lever 74 pivoted at 75 and engaging the threaded extension 71.

The temperature sensing unit 16 comprises a tubular member 76 within which is positioned the customary "invar" rod 78, in this instance fixed in location with respect to the tube by providing the rod with a tight fit within a sealed plug 79.

The rod is provided with a suitable snap action mechanism 106 operable through a bell crank lever 74 to manipulate the control valve.

A diaphragm 108 makes a gas tight seal across a control port 109 and is held in place and sealed at its perimeter by a threaded plug 110. The diaphragm may be a thin, metallic element which is permitted a certain freedom of movement at the center in a lateral direction to make possible an adjustment of the snap action mechanism.

For supporting and centering the snap action mechanism there is provided a disk 117 which is mounted for sliding movement along the wall of the passage which opens into the control port. The disk is fixed to a collar 111 which is equipped with a fulcrum 111' bearing upon a snap disk 112. The collar is adapted to move against the disk thereby to alter the adjustment of the snap action mechanism. Upon the rod 78 is affixed a collar 80' and adjacent thereto is a second collar 113 which is moved by the rod and attached collar 80'. The collar 113 is provided with a fulcrum 113', the point of action of which is opposed and laterally spaced from the point of action of the fulcrum 111'. When the collar 111 is moved relative to the collar 113, the setting of the snap action mechanism is changed.

For moving the collar 111 there is provided a center pin 114 on the side of the diaphragm opposite from the collar 111, the center pin being adapted to be received within a cup-like recess in the inside end of an adjusting pin 116. The adjusting pin in turn is fixed in position on a handle wheel 18 by means of a set screw 92'. The adjusting pin has a threaded engagement with the threaded plug 110.

Therefore, when the adjusting pin is rotated by means of the handle wheel, it will shift its position endwise, and when moved inwardly will press the adjusting pin against the diaphragm. This motion will shift the position of the center of the diaphragm inwardly and be translated to the collar 111 pressing the collar inwardly and thus changed the setting of the snap action mechanism. When the adjusting pin is moved in an opposite direction, the setting of the snap action mechanism will undergo a change in the opposite direction by reason of tension inherent within the mechanism itself.

In operation of the device the handle wheel or knob 18 will customarily be set at normal position wherein a dot 93 thereon will be positioned opposite the position marker 51 or in cold position if preferred. Since the temperature sensing unit is cold at this stage, in either position the control valve will ordinarily open, thereby permitting a potential flow of gas outwardly through the main burner outlet port.

To ignite the pilot light in the appliance it is necessary to turn the handle 17 to pilot position and then depress the button 38 to push the safety valve 33 to open position against or near the electro-magnetic coil. In pilot position the plug valve will be rotated to the position shown in Figure 4 where it will be apparent that gas may flow from the dispersion chamber 22 through the axial passage 56 of the plug valve member, thence outwardly through the lateral port 57 to the pilot passage 28 and pilot outlet port 29. The pilot burner may then be lit, and heat generated will be transformed into electricity by means of the thermo-couple 47 and hold the safety valve in open position, whereby gas flowing into the device through the inlet port will be available to be passed through the device depending upon how other controlling valves are set.

As long as the handle 17 remains in pilot position, no gas can flow to the main burner outlet port. However, after the pilot has been ignited, the handle may be turned to full on position, and gas will then be permitted to pass through the plug valve member through both the valved passage 24 and the pilot passage 28. The pilot outlet port will continue to be supplied, and gas will also be available for the main burner. Since in normal position of the wheel or knob 18 the control valve will be open, gas will immediately pass into the control chamber 26 and thence outwardly through the outlet port to the main burner which in turn may be ignited by the pilot.

As the appliance heats up the temperature sensing unit will be heated, and when a sufficient temperature has been reached, the snap action control 106 will be operated to release the control valve member 65 to a spring pressed closed position, thereby shutting off flow of gas to the main burner. Later, as the appliance cools off, the temperature sensing unit will again function in an opposite direction causing actuation of the snap action mechanism in a contrary direction to open the control valve member causing gas to again flow through the main burner outlet port. Meanwhile, the thermostat action may be altered by rotation of the wheel 18 in one direction or another.

If the handle 17 should then be turned to full off position, gas flow to both the pilot outlet port and the main burner outlet port would be shut off. As soon as the pilot ceases to burn, the thermo-couple 47 cools, acting through the electromagnetic coil to release the safety valve 33 to a closed position. The pilot cannot again be ignited by any means until the handle 17 is rotated to pilot position.

If instead of turning the handle 17 to off position the pilot flame were inadvertently put out while the handle is turned to full on position, the thermo-couple upon cooling would interrupt energization of the electro-magnetic coil and in this instance also release the safety valve, permitting it to close and shut off the entire gas supply to both pilot and main burner outlet ports. Cooling takes place with sufficient promptness so that no appreciable quantity of unignited gas will escape. In this instance likewise the device cannot again be put into operation until the handle 17 is again rotated to pilot position.

By provision of a unitary control of the type described incorporating in cooperable relationship in one casing a thermostat control, a safety control, and necessary main burner and pilot adjustments, there is provided a unitary control device which can be conveniently located on a gas-fired appliance wherein all controls for handling the flow of gas may be tightly sealed and made easily accessible. Full control being thereby localized, problems of adjustment and servicing are minimized. By placing all controls within a single unit, all adjustments may be readily made in the shop before the unit is incorporated into an appliance. Adjustments are, however, made readily accessible. Should conditions change in the field, settings may be varied in order to accommodate the device to the changed conditions. The device is positive in its action and effective of maximum safety regulation in that the gas supply is completely shut off whenever the pilot light is extinguished and cannot be renewed except under conditions of maximum safety.

Although the invention is herein shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices.

We claim:

1. In a thermostatic control device, the combination of a casing having a control port formed therein, a flexible diaphragm closing said port, valve means for controlling fluid flow through said casing, thermally responsive means including an operating member disposed within said casing to be movable relative thereto, snap-action means for transmitting movement from said operating member to said valve means, said snap-action means including a thrust element mounted on said operating member for movement therewith, and an adjustable fulcrum element operatively engageable with one side of said diaphragm, and adjusting means operatively engageable with the other side of said diaphragm for adjusting the position of said fulcrum element relative to said thrust element to thereby set the temperature at which said snap-action mechanism will actuate said valve means.

2. In a thermostatic control device, the combination of a casing having a control port formed therein, a flexible diaphragm closing said port, valve means for controlling fluid flow through said casing, a temperature sensing device including an elongated rod extending into said casing, a snap-action device for transmitting movement from said rod to said valve means, said snap-action device including a thrust element operatively connected to said rod for movement therewith, and a fulcrum element movable relative to said rod and operatively engageable with one side of said diaphragm, and adjusting means operatively engageable with the other side of said diaphragm for adjusting the position of said fulcrum element relative to said thrust element to thereby set the temperature at which said snap-action mechanism will actuate said valve means.

3. In a thermostatic control device, the combination of a casing having a control port formed therein, a flexible diaphragm closing said port, valve means for controlling fluid flow through said casing, a temperature sensing device including an elongated rod extending into said casing, a snap-action device within said casing for transmitting movement from said rod to said valve means, said snap-action device including an annular snap disk, an annular thrust element cooperable with said disk and mounted on said rod for movement therewith, and an annular fulcrum element cooperable with said snap disk and slidably mounted for axial movement relative to said rod, said fulcrum element being operatively engageable with one side of said diaphragm, and adjusting means operatively engageable with the other side of said diaphragm for adjusting the position of said fulcrum element relative to said thrust element to thereby set the temperature at which said snap-action device will actuate said valve means.

JAMES H. HURLBUT.
CHARLES R. HEININGER.

REFERENCES CITED

The following references are of record in the file of this patent:

UNITED STATES PATENTS

| Number | Name | Date |
|---|---|---|
| 1,952,440 | Kelley | Mar. 27, 1934 |
| 2,084,982 | Anderson et al. | June 29, 1937 |
| 2,189,882 | Cerny | Feb. 13, 1940 |
| 2,383,215 | Reynolds | Aug. 21, 1945 |